US010698962B2

(12) United States Patent
McDuff

(10) Patent No.: US 10,698,962 B2
(45) Date of Patent: *Jun. 30, 2020

(54) ANALYSIS OF DATA UTILIZATION

(71) Applicant: International Business Machines Corporation, Armonk, NY (US)

(72) Inventor: Steve McDuff, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/196,171

(22) Filed: Nov. 20, 2018

(65) Prior Publication Data

US 2019/0087494 A1 Mar. 21, 2019

Related U.S. Application Data

(63) Continuation of application No. 15/077,969, filed on Mar. 23, 2016, now Pat. No. 10,169,461, and a continuation of application No. 14/609,466, filed on Jan. 30, 2015.

(51) Int. Cl.
*H04L 29/08* (2006.01)
*G06F 16/951* (2019.01)
*H04L 12/26* (2006.01)
*G06F 16/27* (2019.01)

(52) U.S. Cl.
CPC ............ *G06F 16/951* (2019.01); *G06F 16/27* (2019.01); *H04L 43/065* (2013.01); *H04L 67/1014* (2013.01)

(58) Field of Classification Search
CPC .. G06F 16/951; G06F 16/27; G06F 17/30283; H04L 43/065; H04L 67/1014
See application file for complete search history.

(56) References Cited

U.S. PATENT DOCUMENTS

| 5,918,073 | A | 6/1999 | Hewitt |
| 6,115,712 | A | 9/2000 | Islam et al. |
| 6,338,095 | B1 | 1/2002 | Yasuda et al. |

(Continued)

FOREIGN PATENT DOCUMENTS

| CN | 102918490 A | 2/2013 |
| JP | 2005292428 A | 10/2005 |

(Continued)

OTHER PUBLICATIONS

IBM, "IBM WebSphere Commerce V7.0 Feature Pack 8 accelerates time-to-market for next generation B2B e-commmerce and adds important new capabilities both B2B and B2C", IBM United States Software Announcement 214-379, dated Oct. 1, 2014, Planned availability date, Nov. 26, 2014: Electronic download, Dec. 5, 2014: Physical media, Grace Period Disclosure Document.

(Continued)

*Primary Examiner* — Viet D Vu
(74) *Attorney, Agent, or Firm* — L. Jeffrey Kelly

(57) ABSTRACT

One or more processors determine a first amount of data that was provided to a program by a data source. One or more processors analyze a degree of usage of the first amount of data by the program. One or more processors determine a second amount of data that was used by the program based, at least in part, on the degree of usage. The second amount of data is a portion of the first amount of data.

18 Claims, 8 Drawing Sheets

(56) References Cited

U.S. PATENT DOCUMENTS

| | | |
|---|---|---|
| 6,785,668 B1 | 8/2004 | Polo et al. |
| 6,910,054 B1 | 6/2005 | Herbst et al. |
| 8,024,128 B2 | 9/2011 | Rabinowitz et al. |
| 8,108,517 B2 | 1/2012 | Kalavade |
| 8,156,131 B2 | 4/2012 | Marsden et al. |
| 8,185,096 B2 | 5/2012 | Smith et al. |
| 8,195,748 B2 | 6/2012 | Hallyn |
| 8,234,258 B2 | 7/2012 | Palmer |
| 8,433,786 B2 | 4/2013 | Agrawal et al. |
| 8,595,331 B2 | 11/2013 | Henseler et al. |
| 8,612,397 B2 | 12/2013 | Henderson et al. |
| 8,849,764 B1 | 9/2014 | Long et al. |
| 8,874,665 B2 | 10/2014 | Peterson et al. |
| 8,996,647 B2 | 3/2015 | Lingafelt et al. |
| 9,021,021 B2 | 4/2015 | Backholm et al. |
| 9,378,109 B1 | 6/2016 | Phadke et al. |
| 9,454,531 B1 | 9/2016 | Fisher et al. |
| 9,491,313 B2 | 11/2016 | Lingafelt et al. |
| 2003/0187853 A1 | 10/2003 | Hensley et al. |
| 2005/0038530 A1 | 2/2005 | Nagasaka et al. |
| 2006/0004866 A1 | 1/2006 | Lawrence et al. |
| 2007/0239940 A1 | 10/2007 | Doshi et al. |
| 2008/0072239 A1 | 3/2008 | Liang et al. |
| 2008/0101331 A1 | 5/2008 | Lee et al. |
| 2008/0120129 A1 | 5/2008 | Seubert et al. |
| 2009/0187344 A1 | 7/2009 | Brancaccio et al. |
| 2010/0030521 A1 | 2/2010 | Akhararov et al. |
| 2010/0057618 A1 | 3/2010 | Spicer et al. |
| 2010/0088673 A1 | 4/2010 | Chen et al. |
| 2010/0104177 A1 | 4/2010 | Homma |
| 2011/0196893 A1 | 8/2011 | Bates et al. |
| 2011/0228175 A1 | 9/2011 | Nicoli |
| 2011/0246658 A1 | 10/2011 | Detlori et al. |
| 2011/0296401 A1 | 12/2011 | DePoy |
| 2011/0311051 A1 | 12/2011 | Resch et al. |
| 2012/0089920 A1 | 4/2012 | Eick |
| 2012/0134291 A1 | 5/2012 | Raleigh |
| 2012/0246659 A1 | 9/2012 | de Lira Garza et al. |
| 2012/0311172 A1 | 12/2012 | Branson et al. |
| 2013/0013666 A1 | 1/2013 | Ben-Yehuda et al. |
| 2013/0028400 A1 | 1/2013 | Fix et al. |
| 2013/0122854 A1 | 5/2013 | Agarwal et al. |
| 2013/0159395 A1 | 6/2013 | Backholm et al. |
| 2013/0297560 A1 | 11/2013 | Becker et al. |
| 2014/0188462 A1 | 7/2014 | Zadeh |
| 2014/0237344 A1 | 8/2014 | Murata et al. |
| 2015/0032874 A1 | 1/2015 | Bartholomew et al. |
| 2015/0046659 A1 | 2/2015 | Wu |
| 2015/0066851 A1 | 3/2015 | Henderson |
| 2015/0088807 A1 | 3/2015 | Toppin |
| 2015/0134684 A1 | 5/2015 | Montana et al. |
| 2015/0334249 A1* | 11/2015 | Yin ................... H04L 12/1435 455/406 |
| 2016/0011766 A1 | 1/2016 | Kosaka |
| 2016/0022766 A1 | 1/2016 | Reed |
| 2016/0078071 A1 | 3/2016 | McCoy |
| 2016/0210427 A1 | 7/2016 | Mynhier |
| 2016/0224430 A1 | 8/2016 | Long et al. |
| 2016/0224635 A1 | 8/2016 | McDuff |
| 2016/0226964 A1 | 8/2016 | McDuff |
| 2016/0267159 A1 | 9/2016 | Muller et al. |
| 2016/0306777 A1 | 10/2016 | George et al. |
| 2016/0371237 A1 | 12/2016 | Fisher et al. |
| 2017/0012844 A1 | 1/2017 | Ellison et al. |
| 2017/0026674 A1 | 1/2017 | Bai et al. |
| 2017/0178266 A1 | 6/2017 | Schmidt |

FOREIGN PATENT DOCUMENTS

| | | |
|---|---|---|
| JP | 2013535724 A | 9/2013 |
| JP | 2014194565 A | 8/2015 |

OTHER PUBLICATIONS

Bertini et al., "Quality Metrics in High-Dimensional Data Visualization: An Overview and Systemization", IEEE Transactions on Visualization and Computer Graphics, vol. 17, No. 12, Dec. 2011, pp. 1-10.

Ericsson et al., "A Focus on Efficiency", A Whitepaper from Facebook, Sep. 16, 2013.

Facebook, "A Focus of Efficiency", Sep. 16, 2013.

IBM: List of IBM Patents or Patent Applications Treated As Related (Appendix P), Oct. 17, 2019, pp. 1-2.

* cited by examiner

```
<readEfficiency operationName="Servlet : Request : /webapp/wcs/stores/
servlet/en/aurora/blouses" operationId="7183276388164567143"
parameters="[]" callCount="5" totalByteCount="91715"
readByteCount="2739" readBytePercentage="2" totalObjectCount="4399"
readObjectCount="143" readObjectPercentage="3"/>
```

```
<readEfficiency operationName="REST Tag : http://localhost:80/search/resources/store/
10001/categoryview/byId/10007" operationId="7183276388164567144"
parameters="[catalogId, 10001, currency, USD, langId, -1, responseFormat, json]"
callCount="1" totalByteCount="726" readByteCount="80" readBytePercentage="11"
totalObjectCount="17" readObjectCount="4" readObjectPercentage="23"/>

<readEfficiency operationName="REST Tag : http://localhost:80/search/resources/store/
10001/categoryview/byId/10007" operationId="7183276388164567145"
parameters="[catalogId, 10001, currency, USD, langId, -1, responseFormat, json]"
callCount="1" totalByteCount="726" readByteCount="44" readBytePercentage="6"
totalObjectCount="17" readObjectCount="3" readObjectPercentage="17"/>

<readEfficiency operationName="REST Tag : http://localhost:80/search/resources/store/
10001/productview/byCategory/10007" operationId="7183276388164567146"
parameters="[buyable, 1, catalogId, 10001, currency, USD, langId, -1, responseFormat,
json, searchProfile, IBM_ComposeProductListByCategoryId, searchSource, E,
searchType, 1000, 1000]" callCount="1" totalByteCount="50600" readByteCount="99"
readBytePercentage="0" totalObjectCount="2462" readObjectCount="7"
readObjectPercentage="0"/>

<readEfficiency operationName="REST Tag : http://localhost:80/search/resources/store/
10001/productview/byCategory/10007" operationId="7183276388164567147"
parameters="[advancedFacetList, , catalogId, 10001, categoryId, , currency, USD,
filterFacet, , filterTerm, , filterType, , intentSearchTerm, , langId, -1, manufacturer, ,
maxPrice, , metaData, , minPrice, , orderBy, , pageNumber, 1, pageSize, 12,
physicalStoreIds, , responseFormat, json, searchProfile, , searchTerm, , searchType,
1000]" callCount="1" totalByteCount="38937" readByteCount="2472"
readBytePercentage="6" totalObjectCount="1886" readObjectCount="126"
readObjectPercentage="6"/>

<readEfficiency operationName="REST Tag : http://localhost:80/search/resources/store/
10001/categoryview/byId/10007" operationId="7183276388164567148"
parameters="[catalogId, 10001, currency, USD, langId, -1, responseFormat, json]"
callCount="1" totalByteCount="726" readByteCount="44" readBytePercentage="6"
totalObjectCount="17" readObjectCount="3" readObjectPercentage="17"/>
```

FIG. 4

```
[20/05/14 13:13:20:428 EDT] 00000030 RestClientRea 3   {
 NOT-READ:"recordSetTotal":1,
 NOT-READ:"resourceId":"http://localhost/search/resources/store/10001/
categoryview/byId/
10007?currency=USD&catalogId=10001&responseFormat=json&responseFor
mat=json&langId=-1",
 NOT-READ:"resourceName":"categoryview",
 NOT-READ:"recordSetComplete":"true",
 NOT-READ:"recordSetStartNumber":0,
 READ:"catalogGroupView":[
  READ:{
   NOT-READ:"shortDescription":"Blouses",
   NOT-READ:"resourceId":"http://localhost/search/resources/store/10001/
categoryview/byId/10007",
   READ:"identifier":"Women Shirts Blouses",
   NOT-READ:"parentCatalogGroupID":"10003",
   READ:"name":"Blouses",
   NOT-READ:"uniqueID":"10007",
   NOT-READ:"storeID":"10001",
   NOT-READ:"fullImage":"/wcsstore/Aurora/images/catalog/apparel/women/
category/catr_wcl_blouses.png",
   NOT-READ:"thumbnail":"/wcsstore/Aurora/images/catalog/apparel/women/
category/catr_wcl_blouses.png"
  }
 ],
 NOT-READ:"recordSetCount":1
}
```

FIG. 5

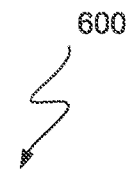

```
"sql-read-report":{
"sql":"SQL select NAME, ADDRESS, ID from USERS"
"rows" : {
            "matchCount":100, // number of rows that matched the query
            "fetchCount":15, // number of rows that were read from the database
            "readCount":10 // number of rows that were read by the client application
            "fetchSize":2260, // amount of data fetched from the database
            "readSize":650 // amount of data read by the client application
},
"columns" : [ // same data, isolated for each column that was fetched
        {
            "name":"NAME",
            "fetchCount":15,
            "readCount":10
            "fetchSize":200,
            "readSize":150
        },
        {
            "name":"ADDRESS",
            "fetchCount":15,
            "readCount":5
            "fetchSize":2000,
            "readSize":500
        },
        {
            "name":"ID",
            "fetchCount":15,
            "readCount":0
            "fetchSize":60,
            "readSize":0
        }
],
```

FIG. 6

```
// data visualization
"data" : [
        READ:   [
                READ:   "John",
                READ:   "123 Street",
                NOT-READ:       1234],
        READ:   [
                READ:   "John",
                READ:   "123 Street",
                NOT-READ:       1234],
        READ:   [
                READ:   "John",
                READ:   "123 Street",
                NOT-READ:       1234],
        READ:   [
                READ:   "John",
                READ:   "123 Street",
                NOT-READ:       1234],
        READ:   [
                READ:   "John",
                READ:   "123 Street",
                NOT-READ:       1234],
        READ:   [
                READ:   "John",
                NOT-READ:       "123 Street",
                NOT-READ:       1234],
        READ:   [
                READ:   "John",
                NOT-READ:       "123 Street",
                NOT-READ:       1234],
        READ:   [
                READ:   "John",
                NOT-READ:       "123 Street",
                NOT-READ:       1234],
        READ:   [
                READ:   "John",
                NOT-READ:       "123 Street",
                NOT-READ:       1234],
        READ:   [
                READ:   "John",
                NOT-READ:       "123 Street",
                NOT-READ:       1234],
        NOT-READ:       [
                NOT-READ:       "John",
                NOT-READ:       "123 Street",
                NOT-READ:       1234],
        NOT-READ:       [
                NOT-READ:       "John",
                NOT-READ:       "123 Street",
                NOT-READ:       1234],
        NOT-READ:       [
                NOT-READ:       "John",
                NOT-READ:       "123 Street",
                NOT-READ:       1234],
        NOT-READ:       [
                NOT-READ:       "John",
                NOT-READ:       "123 Street",
                NOT-READ:       1234],
        NOT-READ:       [
                NOT-READ:       "John",
                NOT-READ:       "123 Street",
                NOT-READ:       1234],
]
                                }
```

ANALYSIS OF DATA UTILIZATION

The following disclosure(s) are submitted under 35 U.S.C. 102(b)(1)(A) as prior disclosures by, or on behalf of, a sole inventor of the present application or a joint inventor of the present application:

IBM WebSphere Commerce V7.0 Feature Pack 8 accelerates time-to-market for next generation B2B e-commerce and adds important new capabilities both B2B and B2C". IBM United States Software Announcement 214-379, dated Oct. 1, 2014.

BACKGROUND OF THE INVENTION

The present invention relates generally to the field of data analytics, and more particularly to the efficiency of data exchange.

There is often a need to exchange data between software programs in distributed software applications. The efficiency of these data exchanges can have an impact on system performance. For example, when web developers exchange data between applications using application programming interfaces (APIs), there are often situations in which more data is received than is required. Analogously, Structure Query Language calls (SQL) to databases typically retrieve more data than is actually used. In such situations, performance degradation is seen because of the extra processing required on the server, network, and client.

SUMMARY

Embodiments of the present invention provide a method, system, and program product to analyze the utilization of data. One or more processors determine a first amount of data that was provided to a program by a data source. One or more processors analyze a degree of usage of the first amount of data by the program. One or more processors determine a second amount of data that was used by the program based, at least in part, on the degree of usage, wherein the second amount of data is a portion of the first amount of data.

BRIEF DESCRIPTION OF THE SEVERAL VIEWS OF THE DRAWINGS

FIG. 4 illustrates a second part of a first example of data included in a data consumption analysis, in accordance with an exemplary embodiment of the present invention.

FIG. 5 illustrates a third part of a first example of data included in a data consumption analysis, in accordance with an exemplary embodiment of the present invention.

FIG. 6 illustrates a first part of a second example of data included in a data consumption analysis, in accordance with an exemplary embodiment of the present invention.

FIG. 7 illustrates a second part of a second example of data included in a data consumption analysis, in accordance with an exemplary embodiment of the present invention.

DETAILED DESCRIPTION

Embodiments of the present invention recognize that processor performance can be adversely affected by unnecessary data exchange between applications and databases or other applications. Embodiments of the present invention recognize that there are many situations where data requests return more data than is actually needed. Embodiments of the present invention provide an ability to analyze the amount of data used by a data consumer relative to the amount of data received by that consumer. Embodiments of the present invention provide an ability to see how inefficient data exchange between applications and databases or other applications may be modified to improve processor performance.

The present invention will now be described in detail with reference to the Figures.

Figure 1:
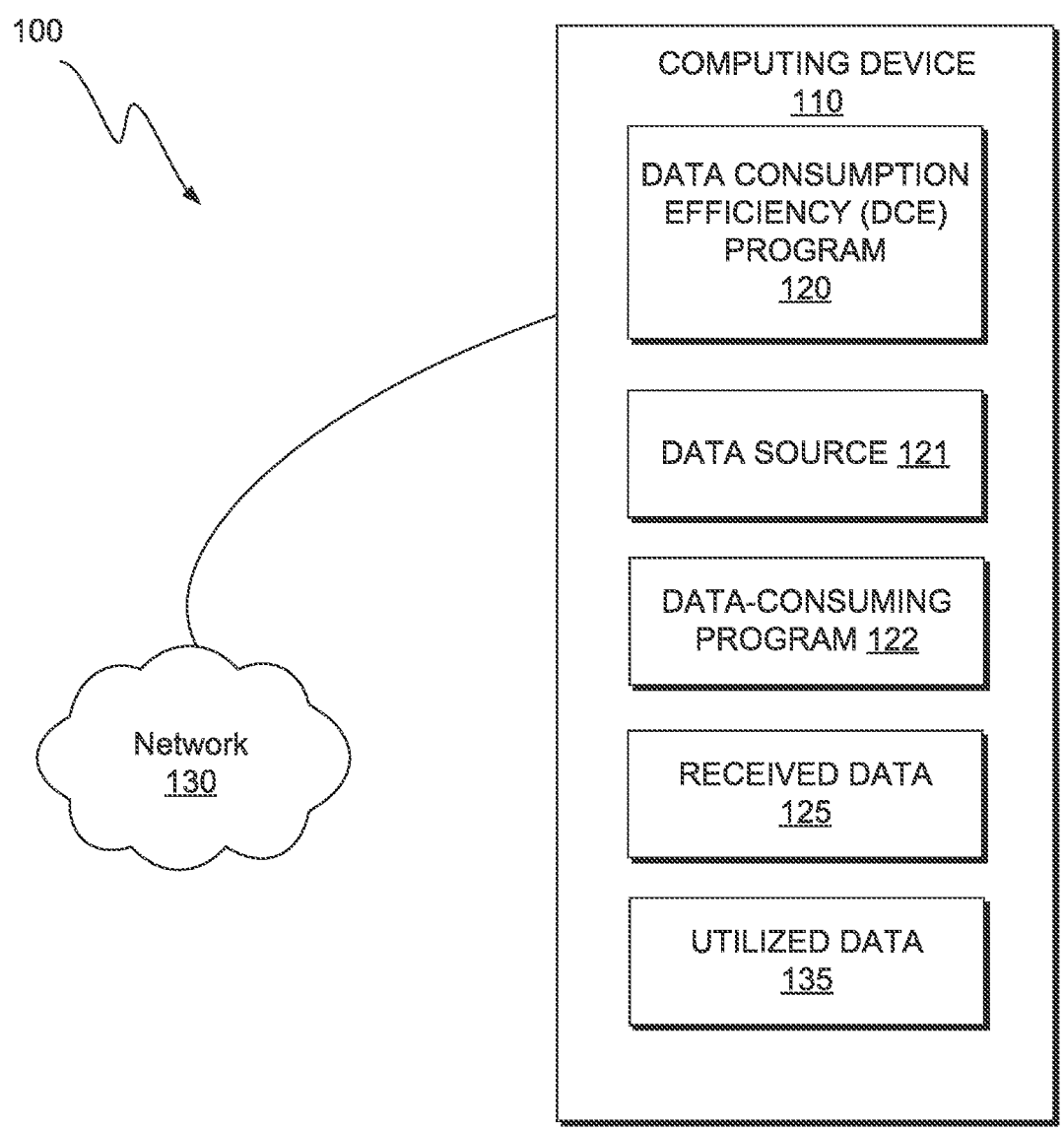
FIG. 1 is a functional block diagram illustrating a data analytics environment, in accordance with an exemplary embodiment of the present invention.

FIG. 1 is a functional block diagram illustrating a data analytics environment, generally designated 100, in accordance with one embodiment of the present invention. Data analytics environment 100 includes computing device 110 connected over network 130. Computing device 110 includes DCE program 120, data source 121, data-consuming program 122, received data 125, and utilized data 135.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to DCE program 120, data source 121, data-consuming program 122, received data 125, and utilized data 135, and is capable of executing DCE program 120, certain embodiments of data source 121, and data-consuming program 122. Computing device 110 may include internal and external hardware components, as depicted and described in further detail with respect to FIG. 8.

In this exemplary embodiment, DCE program 120, data source 121, data-consuming program 122, received data 125, and utilized data 135 are stored on computing device 110. However, in other embodiments, DCE program 120, data source 121, data-consuming program 122, received data 125, and utilized data 135 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110, DCE program 120, data source 121, data-consuming program 122, received data 125, and utilized data 135, in accordance with a desired embodiment of the present invention.

In various embodiments, DCE program 120 produces an analysis of how efficiently received data 125, obtained from data source 121, was utilized by data-consuming program 122. In one embodiment, DCE program 120 instruments received data 125 and stores it as a part of a data registry within its program. DCE program 120 then determines what portion of received data 125 provided by data source 121 was read by data-consuming program 122. In one embodiment, DCE program 120 produces a report on the types of data within received data 125 that are utilized by data-consuming program 122 compared to all of the types of data within received data 125 that are sent by data source 121. In one embodiment, DCE program 120 produces a report on the amount of data within received data 125 that are utilized by data-consuming program 122 compared to the total amount of data within received data 125 that are sent by data source 121. In some embodiments, DCE program 120 produces a report on the number of data fragments within received data 125 that are utilized by data-consuming program 122 compared to the total number of data fragments within received data 125 that are sent by data source 121.

In various embodiments, data source 121 includes an application with access to data, a database, or a combination thereof. In one embodiment, data source 121 includes an application with access to data that can be interfaced with data-consuming programs such as data-consuming program 122 using an API. In one embodiment, data source 121 includes a database that can be accessed by a data-consuming program such as data-consuming program 122 using a SQL query.

In various embodiments, data-consuming program 122 includes any application that consumes data from data sources, either local or remote. The sources of data, such as data source 121, includes applications with access to data, databases or a combination thereof. In one embodiment, data-consuming program 122 includes a program that utilizes an API call to obtain data from another application. In one embodiment, data-consuming program 122 includes a program the uses a SQL query to obtain data from a database.

In various embodiments, received data 125 is any data that is receivable by data-consuming programs such as data-consuming program 122 and is sent from data sources such as data source 121. In some embodiments, received data 125 is data received as a result of an API query by a data-consuming program such as data-consuming program 122 to a data source such as data source 121. For example, received data 125 is data from a commercial catalog as a result of an API query to a commercial vendor. In this embodiment, one possible component of received data 125 is the type of product, such as clothing, household furniture, or electronic merchandise. In other examples, received data includes catalog number, store ID (if not home delivery), product color, or product size. In yet other examples, received data 125 includes other types of information, e.g., the cost of a product and cost of shipping that product. However, received data 125 is not limited to any one area such as, for example, commerce. Instead, received data 125 is any application-derived data the utilization of which is determinable. In one exemplary embodiment, received data 125 is a SQL query by data-consuming programs such as data-consuming program 122 to databases. For example, received data 125 is data sent to data-consuming program 122 as a result of an SQL query to a database, the data containing information such as names, addresses, and ID numbers, etc.

In various embodiments, utilized data 135 is a subset of received data 125 wherein utilized data 135 is the portion of received data 125 used by data-consuming product 122. In one embodiment, DCE program 120 detects what subset of received data 125 was used by data-consuming program 122. For example, data-consuming program 122 reads a subset of received data 125 and doesn't read another subset of received data 125. DCE program 120 flags as read the subset of received data 125 that was read by data-consuming program 122 and adds the flagged received data 125 subset to utilized data 135.

Figure 2:
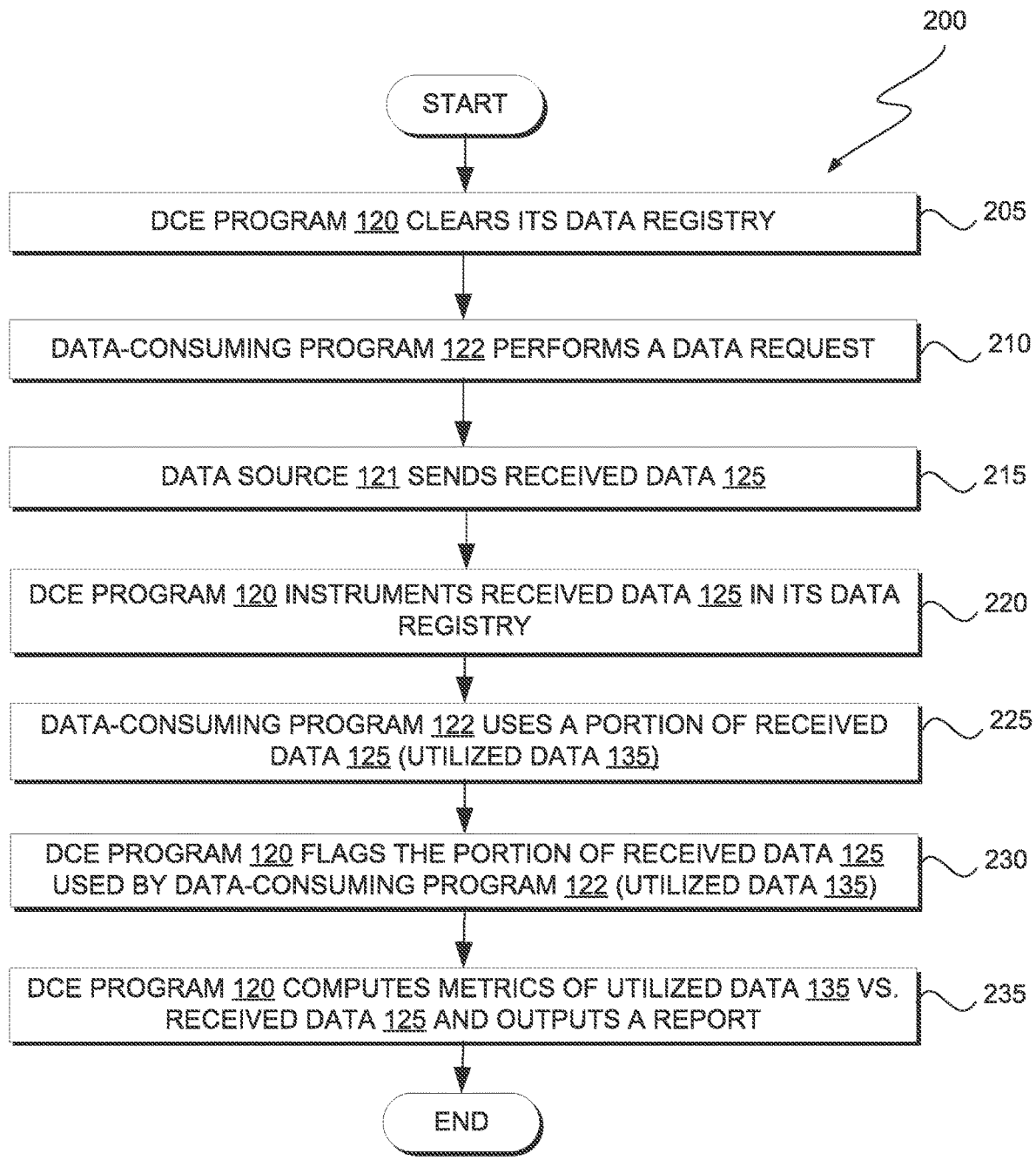
FIG. 2 illustrates operational processes of a data consumption efficiency (DCE) program, a data source, and a data-consuming program, on a computing device within the environment of FIG. 1, in accordance with an exemplary embodiment of the present invention.

FIG. 2 illustrates operational processes, 200, of DCE program 120, data source 121, and data-consuming program 122 on computing device 110 within the environment of FIG. 1, in accordance with an exemplary embodiment of the present invention. In step 205, DCE program 120 clears a space in its data registry for inputting received data 125 and utilized data 135. The cleared data registry space in DCE program 120 includes the ability to accept many types of digital data. For example, the cleared data registry space in DCE program 120 accepts metadata, which is essentially data about data. There are at least three types of metadata: structural, descriptive, and administrative. Structural metadata describes the design and specification of data structures, i.e., data about "containers" that hold data. Descriptive metadata describes individual instances of application data or the data content. In general, administrative metadata is often used to facilitate the management of information resources through elements such as version number, archiving date, and other technical information for purposes of file management, rights management and preservation.

In step 210, data-consuming program 122 performs data requests from data source 121. In various embodiments, the data requests involve any type of data transactions between applications or databases and applications. For example, the requests include, but are not limited to, queries such as API calls for World Wide Web (WWW) requests or SQL calls for database requests.

In step 215, data source 121 sends the requested data, e.g., received data 125, for use by both data-consuming program 122 and DCE program 120. In one embodiment received data is sent to both data-consuming program 122 and DCE program 120 by data source 121. In other embodiments, data source 121 sends received data 125 to just one of the applications (e.g., data-consuming program 122 or DCE program 120), which then provides the other application access to received data 125.

In step 220, DCE program 120 applies instrumentation to received data 125 in a data registry within DCE program 120 for future comparison to utilized data 135. In the context of computer programming, instrumentation refers to an ability to monitor or measure the level of product performance, to diagnose errors and to write trace information. Programmers implement instrumentation in the form of code instructions that monitor specific components in a system (for example, instructions may output logging information to appear on screen). When an application contains instrumentation code, it is capable of being managed using a management tool. In some embodiments, DCE program 120 includes functionality to utilize instrumentation processes to manage the data included in received data 125. Instrumentation is necessary to review the performance of the application. Instrumentation approaches can be of two types: Source instrumentation and binary instrumentation.

Instrumentation includes the ability of the application to incorporate: i) Code tracing, which is receiving informative messages about the execution of an application at run time; ii) debugging and (structured) exception handling, i.e., tracking down and fixing programming errors in an application under development; iii) profiling (computer programming), which is a means by which dynamic program behaviors can be measured during a training run with a representative input. This is useful for properties of a program which cannot be analyzed statically with sufficient precision, such as alias analysis; iv) performance counters, which are components that allow the tracking of the performance of the application; v) computer data logging, which are components that allow the logging and tracking of major events in the execution of the application.

In step 225, data-consuming program 122 uses some portion of received data 125. For example, data-consuming program 122 reads a portion of the data supplied by an API call to a web address or a portion of data from a SQL call to a database. In general, it is typical that a data-consuming program such as data-consuming program 122 will request more information than is actually required from a data source such as data source 121. For example, an API query typically results in the delivery of more data than is actually needed by a web developer. Analogously, a SQL call in a database query will often result in more data being provided than necessary.

In step 230, DCE program 120 flags the portion of received data 125 used by data consuming-program 122, i.e., utilized data 135. In computer programming, a flag field is an integer interpreted as a sequence of Boolean bits, each called a "flag." Flags are typically found as members of a defined data structure, such as a database record, and the meaning of the value contained in a flag will generally be defined in relation to that data structure. One common use of flags is to mark or designate data structures for future processing. Within microprocessors and other logic devices, flags are commonly used to control or indicate the intermediate or final state or outcome of different operations. Microprocessors typically have, for example, a status register that is composed of such flags, and the flags are used to indicate various post-operation conditions, such as whether a data fragment has been read by an application such as data-consuming program 122.

In step 235, DCE program 120 computes various metrics of utilized data 135 compared to received data 125 and outputs a report. In one embodiment, the report includes metrics such as the identity of an operation that requested the data such as a JavaServer Pages (JSP) name or a Java Method name. In one embodiment, the analysis includes the identity of a query that was used to request the data such as a uniform resource locator (URL) in the case of a RESTful request (a query that complies with the architectural constraints of a representational state transfer, i.e. REST). Yet another embodiment includes the output of the identity of a SQL call if the query was a database request.

In various embodiments, data "counts" are reported by DCE program 120. In one example, data-consuming program 122 reads five hundred bytes of the two thousand bytes of data provided by data source 121. The data sent by data source 121 is instrumented by DCE program 120 and the data read by data-consuming program 122 is flagged by DCE program 120, which then reports a read byte count of "500" and a total byte count of "2000." In another example, data-consuming program 122 reads fifty data fragments of the two hundred data fragments provided by data source 121. DCE program 120 reports a read object (i.e. fragment) count of "50" and a total object count of "200." In one embodiment, the percent of data used or read is reported by DCE program 120. For example, data-consuming program 122 reads three hundred bytes of the three thousand bytes of data provided by data source 121. DCE program 120 reports a read byte percentage of "10." In another example, data-consuming program 122 uses or reads ten data fragments of the two hundred data fragments provided by data source 121. DCE program 120 reports a read object percentage of "5." In yet another embodiment, the DCE program 120 output includes the actual data with a flag indicating which piece of data was used.

In various embodiments, the DCE program 120 output includes a statistical analysis that spans multiple data transactions between data source 121 and data-consuming program 122. In one embodiment, the DCE program 120 output includes the average size of data both received and used over multiple data exchanges between data source 121 and data-consuming program 122. For example, data source 121 provides data to data-consuming program 122 over the course of several API or SQL calls. DCE program 120 computes the average amount of data (bytes, fragments, etc.) provided by data source 121 during the API or SQL calls and reports that average amount. In another example, DCE program 120 also computes the average amount of data utilized by data-consuming program 122. In one embodiment, DCE program 120 computes the average amount percent (bytes, fragments, etc.) of data used by data-consuming program 122. In some embodiments, DCE program 120 tracks the amount (bytes, fragments, etc.) of both the data provided by data source 121 and the data utilized by data-consuming program 122 over the course of multiple data transactions and provides a statistical analysis of the data used by data-consuming program 122. For example, after numerous data exchanges DCE program 120 provides a specified percentile data size range (such as a $95^{th}$ percentile data size range) for both data provided by data source 121 and data utilized by data-consuming program 122.

Figure 3:
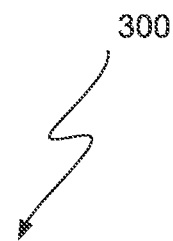
FIG. 3 illustrates a first part of a first example of data included in a data consumption analysis, in accordance with an exemplary embodiment of the present invention.

FIG. 3 illustrates a first part, 300, of a first example of data included in a data consumption analysis by DCE program 120, in accordance with an exemplary embodiment of the present invention. In this example, DCE program 120 provides an analysis regarding the amount of API-queried data that was actually read by REST clients during five REST calls. The analysis includes: i) The operation that requested the data and the query that was used: readEfficiency operationName="Servlet: Request: /webapp/wcs/stores/servlet/en/aurora/blouses", ii) a numerical operation ID: operationId="71832763881164567143", iii) parameters selected for single REST calls: parameters="[ ]" (in this example, parameters are not displayed because this output involves more than one REST call), iv) the number of REST calls: callCount="5", v) the number of bytes received by the REST client: totalByteCount="91715", vi) the number of bytes read by the REST client: readByteCount="2739", vii) the percentage of received bytes that were read by the REST client: readBytePercentage="2", viii) the number of objects (data fragments) received by the REST client: totalObjectCount="4399", ix) the number of objects read by the REST client: readObjectCount="143", and x) the percentage of received objects that were read by the REST client: readObjectPercentage="3".

FIG. 4 illustrates a second part, 400, of a first example of data included in a data consumption analysis by DCE program 120, in accordance with an exemplary embodiment of the present invention. In this example, DCE program 120 provides an analysis for each of the five individual REST calls from the example in FIG. 3. The analysis provided for the first REST call (operation ID 71832763881164567144) is representative: The parameters selected by the first REST client and their values are given by the entry: parameters="[catalogId, 10001, currency, USD, langId, −1, responseFormat, json]". Thus, the catalog number is 10001, the currency used is U.S. dollars, and the language is designated by the language encoded by "−1." The last parameter shows the format that was used in the response by data source 121 to the request for data by data-consuming program 122. JSON is short for JavaScript Object Notation, which is an open standard format that uses human-readable text to transmit data objects consisting of attribute—value pairs. JSON is used primarily to transmit data between a server and web application, as an alternative to XML. Other data such as total and read byte count (totalByteCount="726" readByteCount="80"), read byte percentage (readBytePercentage="11"), total and read object count (totalObjectCount="17" readObjectCount="4"), and read object percentage (readObjectPercentage="23") reflect the contribution of the individual call to the statistics shown in FIG. 3.

FIG. 5 illustrates a third part, 500, of a first example of data included in a data consumption analysis by DCE program 120, in accordance with an exemplary embodiment of the present invention. In this example, DCE program 120 is providing analysis for one of the five individual REST calls from the example in FIG. 4. This output by DCE program 120 shows what objects were read and which objects were not read by a REST client. For example, "recordSetTotal", "resourceId", "resourceName", "recordSetComplete", "recordSetStartNumber", "shortDescription", "resourceID", "parentCatalogGroupID", "uniqueID", "storeID", "fullImage", "thumbnail", and "recordSetCount" were not read by the REST client according to the analysis in FIG. 5. However, "catalogGroupView", "identifier", and "name" were read by the REST client.

FIG. 6 illustrates a first part, 600, of a second example of data included in a data consumption analysis by DCE program 120, in accordance with an exemplary embodiment of the present invention. In this example, DCE program 120 provides an analysis of the amount of data that was actually read by client applications during an SQL query of a database. In this example, the "fetched" data is received data 125, which is acquired by data-consuming program 122 from data source 121 and instrumented by DCE program 120. The "read" data is utilized data 135, which is the subset of received data 125 that is utilized by data-consuming program 122 and subsequently flagged by DCE program 120. The SQL query shown in FIG. 6 selects for a name, address, and ID. The analysis includes: i) Data showing the number of rows (100) in the database that matched the query: "matchCount":100, ii) the number of rows (15) that were read from the database: "fetchCount":15, iii) the subset of rows (10) read from that database that were read by the client application: "readCount":10, iv) the amount of data (2260 bytes) that was read from the database: "fetchSize": 2260, and v) the subset of data (650 bytes) read from that database that were read by the client application: "readSize": 650.

FIG. 6 also includes an analysis for each of three different types of data included in the columns of the queried data: Name, address, ID. The "name" data are names of individuals that live at each "address," which are the residences of the individuals. The "ID" data are separated identifiers for each individual queried. The data in FIG. 6 is representative of data that, for example, arises from data queries of mailing lists. In this example, the queried name column was read by the client application in ten of the fifteen fetched rows accounting for one hundred fifty of the two hundred fetched bytes. The queried address column was read by the client application in five of the fifteen fetched rows accounting for five hundred of the two thousand fetched bytes. Finally, the queried ID column was not read at all (zero "readCount" and "readSize").

FIG. 7 illustrates a second part, 700, of a second example of data included in a data consumption analysis by DCE program 120, in accordance with an exemplary embodiment of the present invention. In this example, DCE program 120 determines which columns are read by the client application for each row. Each row in which even one column was read is overall designated "READ" to the left. In the first ten rows the name "John" was read by data-consuming program 122 and the address "123 Street" was read by data-consuming program 122 in five of those rows. The last five rows are marked "UNREAD" because none of the columns were read by data-consuming program 122 in those rows.

Figure 8:
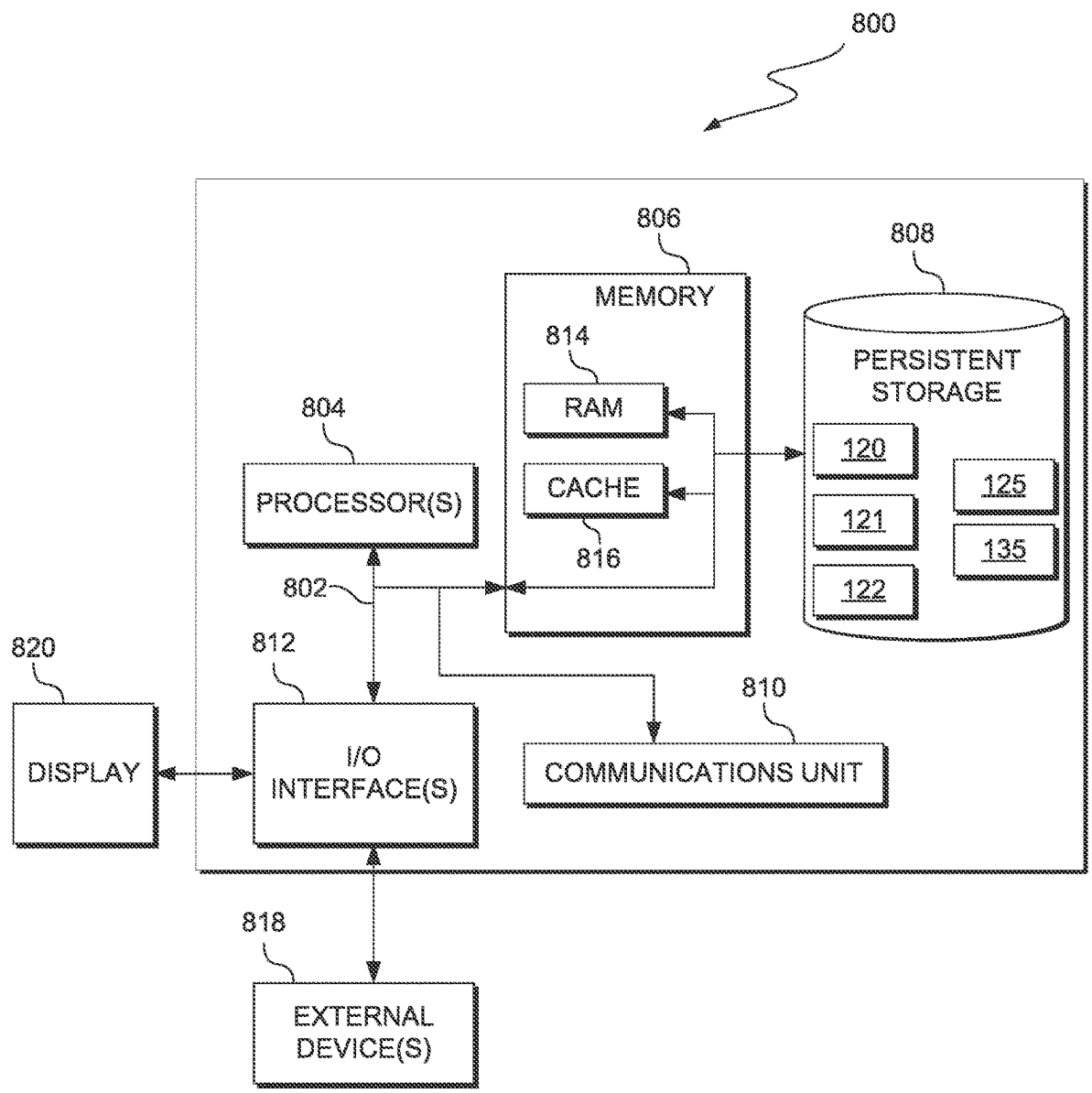
FIG. 8 depicts a block diagram of components of the computing device executing the DCE program, in accordance with an exemplary embodiment of the present invention.

FIG. 8 depicts a block diagram, 800, of components of computing device 110, in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

Computing device 110 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 814 and cache memory 816. In general, memory 806 can include any suitable volatile or non-volatile computer-readable storage media.

DCE program 120, data source 121, data-consuming program 122, received data 125, and utilized data 135 are stored in persistent storage 808 for execution and/or access by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 810, in these examples, provides for communications with other data processing systems or devices, including resources of network 130. In these examples, communications unit 810 includes one or more network interface cards. Communications unit 810 may provide communications through the use of either or both physical and wireless communications links. DCE program 120, data source 121, data-consuming program 122, received data 125, and utilized data 135 may be downloaded to persistent storage 808 through communications unit 810.

I/O interface(s) 812 allows for input and output of data with other devices that may be connected to computing device 130. For example, I/O interface 812 may provide a connection to external devices 818 such as a keyboard, keypad, a touch screen, and/or some other suitable input device. External devices 818 can also include portable computer-readable storage media such as, for example, thumb drives, portable optical or magnetic disks, and memory cards. Software and data used to practice embodiments of the present invention, e.g., DCE program 120, data source 121, data-consuming program 122, received data 125, and utilized data 135, can be stored on such portable computer-readable storage media and can be loaded onto persistent storage 808 via I/O interface(s) 812. I/O interface(s) 812 also connect to a display 820.

Display 820 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk" and the like may be subject to trademark rights in various jurisdictions throughout the world and are used here only in reference to the products or services properly denominated by the marks to the extent that such trademark rights may exist.

What is claimed is:

1. A method for determining efficiency of data exchange comprising:
   determining, by one or more processors, a first amount of data that was provided to a program by a data source;
   analyzing, by one or more processors, a degree of usage of the first amount of data by the program;
   determining, by one or more processors, a second amount of data that was used by the program based, at least in part, on the degree of usage, wherein the second amount of data is a portion of the first amount of data;
   initializing, by one or more processors, a data registry in response to a start of an operation;
   instrumenting, by one or more processors, a first data into the data registry;
   determining, by one or more processors, whether the first data was read by the program;
   responsive to a determination that the first data was read by the program, flagging, by one or more processors, the first data;
   determining, by one or more processors, a degree of efficiency of data usage by the program; and
   generating, by one or more processors, a report indicating the degree of efficiency of data usage by the program.

2. The method of claim 1 further comprising:
   determining, by one or more processors, one or more types of data within the first amount of data that were used by the program.

3. The method of claim 1, wherein the step of determining, by one or more processors, the first amount of data that was provided to the program by the data source further comprises:
   determining, by one or more processors, the first amount of data that was provided to the program by the data source using one or both of an application programming interface call and a Structured Query Language query.

4. The method of claim 1 further comprising:
   generating, by one or more processors, an analysis that includes one or more outputs, wherein the outputs include one or more of: an operation name, an operation identification number, the first amount of data, the second amount of data, a percent data amount used by the program, a set of parameters used by the operation, and a list of the first amount of data, wherein the list of the first amount of data includes a set of data flagged as read and a set of data flagged as unread.

5. The method of claim 1 further comprising:
   initializing, by one or more processors, a data registry in response to a start of an operation;
   instrumenting, by one or more processors, a first data into the data registry;
   determining, by one or more processors, whether the first data was read by the program; and
   responsive to a determination that the first data was read by the program, flagging, by one or more processors, the first data.

6. The method of claim 1 further comprising:
   determining, by one or more processors, a degree of efficiency of data usage by the program; and
   generating, by one or more processors, a report indicating the degree of efficiency of data usage by the program.

7. A computer program product for capturing event information comprising:
   one or more computer-readable storage media and program instructions stored on the one or more computer-readable storage media, the program instructions comprising:
   program instructions to determine a first amount of data that was provided to a program by a data source;
   program instructions to analyze a degree of usage of the first amount of data by the program;
   program instructions to determine a second amount of data that was used by the program based, at least in part, on the degree of usage, wherein the second amount of data is a portion of the first amount of data;
   program instructions to initialize a data registry in response to a start of an operation;
   program instructions to instrument a first data into the data registry;
   program instructions to determine whether the first data was read by the program;
   program instructions to respond to a determination that the first data was read by the program by flagging the first data;
   program instructions to determine a degree of efficiency of data usage by the program; and
   program instructions to generate a report indicating the degree of efficiency of data usage by the program.

8. The computer program product of claim 7 further comprising:
   program instructions to determine one or more types of data within the first amount of data that were used by the program.

9. The computer program product of claim 7, wherein program instructions to determine the first amount of data that was provided to the program by the data source further comprises:
   program instructions to determine the first amount of data that was provided to the program by the data source using one or both of an application programming interface call and a Structured Query Language query.

10. The computer program product of claim 7 further comprising:
program instructions to generate an analysis that includes one or more outputs, wherein the outputs include one or more of: an operation name, an operation identification number, the first amount of data, the second amount of data, a percent data amount used by the program, a set of parameters used by the operation, and a list of the first amount of data, wherein the list of the first amount of data includes a set of data flagged as read and a set of data flagged as unread.

11. The computer program product of claim 7 further comprising:
program instructions to initialize a data registry in response to a start of an operation;
program instructions to instrument a first data into the data registry;
program instructions to determine whether the first data was read by the program; and
program instructions to respond to a determination that the first data was read by the program by flagging the first data.

12. The computer program product of claim 7 further comprising:
program instructions to determine a degree of efficiency of data usage by the program; and
program instructions to generate a report indicating the degree of efficiency of data usage by the program.

13. A computer system for determining efficiency of data exchange comprising:
one or more computer processors;
one or more computer readable storage medium;
program instructions to determine a first amount of data that was provided to a program by a data source;
program instructions to analyze a degree of usage of the first amount of data by the program;
program instructions to determine a second amount of data that was used by the program based, at least in part, on the degree of usage, wherein the second amount of data is a portion of the first amount of data;
program instructions to initialize a data registry in response to a start of an operation;
program instructions to instrument a first data into the data registry;
program instructions to determine whether the first data was read by the program;
program instructions to respond to a determination that the first data was read by the program by flagging the first data;
program instructions to determine a degree of efficiency of data usage by the program; and
program instructions to generate a report indicating the degree of efficiency of data usage by the program.

14. The computer system of claim 13 further comprising:
program instructions to determine one or more types of data within the first amount of data that were used by the program.

15. The computer system of claim 13, wherein the program instructions to determine the first amount of data that was provided to the program by the data source further comprise:
program instructions to determine the first amount of data that was provided to the program by the data source using one or both of an application programming interface call and a Structured Query Language query.

16. The computer system of claim 13 further comprising:
program instructions to generate an analysis that includes one or more outputs, wherein the outputs include one or more of: an operation name, an operation identification number, the first amount of data, the second amount of data, a percent data amount used by the program, a set of parameters used by the operation, and a list of the first amount of data, wherein the list of the first amount of data includes a set of data flagged as read and a set of data flagged as unread.

17. The computer system of claim 13 further comprising:
program instructions to initialize a data registry in response to a start of an operation;
program instructions to instrument a first data into the data registry;
program instructions to determine whether the first data was read by the program; and
program instructions to respond to a determination that the first data was read by the program by flagging the first data.

18. The computer system of claim 13 further comprising:
program instructions to determine a degree of efficiency of data usage by the program; and
program instructions to generate a report indicating the degree of efficiency of data usage by the program.

* * * * *